RF POWER LIMITER COMPRISING AN IRRADIATED SEMICONDUCTOR BLOCK

Filed Feb. 12, 1968

INVENTOR
SAMUEL DIXON JR.
BY Jack H. Stanley AGENT.
Harry M. Saragovitz,
Edward J. Kelly & Herbert Berl
ATTORNEYS United States Patent Office 3,465,266

Patented Sept. 2, 1969

3,465,266
RF POWER LIMITER COMPRISING AN IRRADIATED SEMICONDUCTOR BLOCK

Samuel Dixon, Jr., Neptune, N.J., assignor to the United States of America as represented by the Secretary of the Army Filed Feb. 12, 1968, Ser. No. 704,664
Int. Cl. H04b *3/04*
U.S. Cl. 333—17 8 Claims

ABSTRACT OF THE DISCLOSURE

An RF power limiter including a ridged waveguide section on which is mounted an intrinsic silicon semiconductor block. The semiconductor block is irradiated and preionized by a laser beam, the degree of preionization being predetermined such that at a critical power level $P_c$, avalanche breakdown occurs within the semiconductor. The avalanche breakdown will cause reflection to take place so that $P_c$ will be the limited power output.

The invention descibed herein may be manufactured, used, and licensed by or for the Government for governmental purposes without the payment to me of any royalty thereon.

Background of the invention

This invention relates to microwave transmission systems and more particularly to semiconductor elements for use in such systems as power limiters.

Present state of the art semiconductor limiters are restricted in the application as duplexing devices. In the case of the diode type, they are limited in their high frequency response and power handling capabilities. Although ferrites may also be utilized as power limiters, it has been found that the effectiveness of the ferrite as a power limiter is rather limited at relatively high power levels.

Summary of the invention

It is an object of the present invention to provide a control for the power flow in a waveguide system over a very wide range of frequency and power variations.

It is another object of the present invention to provide a power limiter for operation at microwave frequencies which provides a flat response with very little spike leakage over a relatively large dynamic range.

In accordance with the present invention there is provided a device for limiting the power of RF energy which includes a ridged waveguide section having an input and an output end. Also included is a block of intrinsic semiconductor material, preferably silicon, which is mounted on the ridge within the waveguide section. Included further are means for irradiating the semiconductor block to pre-ionize a portion of the neutral impurities therein. The semiconductor block is responsive to the RF power as it propagates through the waveguide such that avalanche breakdown occurs at a prescribed input RF level, the magnitude of which is a function of the pre-ionized state. The RF output power level will not increase beyond the level where avalanche occurs as the input RF power increases beyond the prescribed level.

Brief description of the drawing

For a better understanding of the invention, together with other and further objects thereof, reference is had to the following description taken in connection with the accompanying drawing in which.

Description of the preferred embodiment

Figure 1:
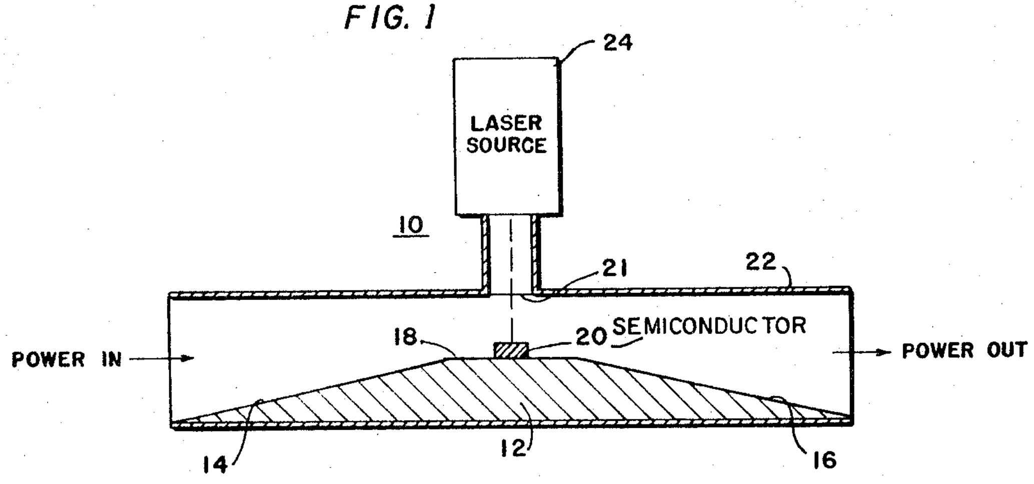
FIG. 1 illustrates a preferred embodiment of the invention.
Figure 2:
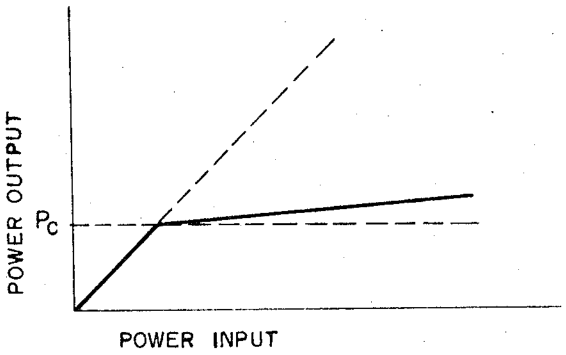
FIG. 2 is a graphical representation of the power output versus power input characteristics of the power limiter shown in FIG. 1.

Referring now to the drawing, there is shown at 10 a single ridged waveguide section with the ridge shown at 12 longitudinally positioned within the waveguide. As shown, the ridge 12 is provided with conventional tapered ends as at 14 and 16 for matching purposes and a flat section 18 therebetween. The input energy may be applied at end 14 and the output energy derived from end 16. Centrally positioned on flat ridge section 18 is a relatively small semiconductor block 20 of intrinsic silicon. While the dimensions of the semiconductor block 20 are not critical, it has been found that a specimen approximately 50 mils square and 5 to 10 mils thick yielded the best results. The top wall 22 of waveguide section 10 is provided with an aperture 21 made slightly larger than semiconductor block 20, and in opposition thereto. Hermetically sealed to the top wall 22 is a gallium arsenide laser source 24 having its laser beam focussed such that it passes through aperture 21 and impinges on the top exposed surface of semiconductor block 20 to irradiate the block 20. The intensity of the laser beam is adjusted so that a portion of the neutral impurities in semiconductor block 20 are pre-ionized. The degree of pre-ionization is a function of the critical power level $P_c$ where limiting action is to take place. This limitation occurs when the RF power at $P_c$ is such that, with a given laser beam intensity, it causes avalanche breakdown in the intrinsic silicon semiconductor block 20. As shown in FIG. 2, at relatively low power levels, the energy imparted to the solid state plasma is very small so that RF power may propagate through the waveguide 10 with very little loss. Until the limiting power level is reached, the dielectric constant $\epsilon$ of the semiconductor block 20 may be at a prescribed value, 15, for example, which will permit a good impedance match to the respective tapered input and output ends 14 and 16 of the waveguide 10. At the limiting critical power level $P_c$, the energy imparted to the electrons and holes of the semiconductor block 20 is enough to create a net gain in energy, therefore avalanche breakdown occurs. The conductivity of the semiconductor block 20 increases rapidly with a consequent decrease in the dielectric constant. With a change in the dielectric constant of semiconductor block 20, the RF energy will be reflected toward the source such that limiting action takes place at $P_c$ as shown in FIG. 2.

Although a laser beam has been shown as the irradiating source, it is to be understood that other types of beams may be utilized to achieve the same result. For example, an electron beam having a pre-ionized electron-volt velocity may be substituted for the laser beam. The limiter would operate in the same manner as described above, with the limiting critical power $P_c$ being a function of the velocity or intensity of the electron beam and the RF power level at which limiting is desired.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A device for limiting the power of RF energy comprising a ridged waveguide section having an input end and an output end, and adapted to propagate said RF energy, a block of intrinsic semiconductor material mounted on the ridge within said waveguide section, means for irradiating said semiconductor block whereby a portion of the neutral impurities therein are in a pre-ionized state, said semiconductor block being responsive to the RF power as it propagates through said waveguide such that avalanche breakdown occurs at a prescribed input RF power level, the magnitude of said prescribed power level being a function of said pre-ionized state, said prescribed input RF power level being the limiting value derived from the output of said waveguide as the input RF power increases beyond said prescribed level.

2. The power limiter in accordance with claim 1 wherein said block comprises intrinsic silicon.

3. The power limiter in accordance with claim 2 wherein said waveguide section is a single ridge waveguide section, said ridge being tapered at the input and output ends of said waveguide section and having a flat surface therebetween.

4. The power limiter in accordance with claim 3 wherein said block of intrinsic silicon is centrally positioned on said flat surface, and further including an aperture in the waveguide wall opposite the free surface of said silicon block, and wherein said irradiating means comprises a source for producing a laser beam focussed through said aperture to impinge on said silicon block.

5. The power limiter in accordance with claim 4 wherein said laser source includes gallium arsenide.

6. The power limiter in accordance with claim 1 wherein said waveguide section includes a single ridge tapered at both the input and output ends of said waveguide section and having a flat section therebetween, said semiconductor block being positioned on said flat surface.

7. The power limiter in accordance with claim 6 and further including an aperture in the waveguide wall opposite the free surface of said semiconductor block, and wherein said irradiating means comprises a laser beam source for producing a laser beam focussed through said aperture to impinge on said semiconductor block.

8. An RF power limiter comprising a single ridge waveguide section having tapered input and output ends with the free surface of the ridge facing a broad wall of said waveguide section and adapted to propagate RF energy.

a block of intrinsic silicon mounted on said ridge intermediate said input and output ends, an aperture in said broad waveguide wall opposite said silicon block, and a laser beam source outside of said broad wall and arranged such that the produced laser beam passes through said aperture to impinge on and irradiate said silicon block, the intensity of said laser beam being such that a prescribed portion of the neutral impurities in said silicon block are in a pre-ionized state, the limiting RF power level at the output end of said ridge waveguide occurring at a magnitude where avalanche breakdown in said silicon block is achieved.

References Cited

UNITED STATES PATENTS 2,911,601 11/1959 Gunn et al.

HERMAN KARL SAALBACH, Primary Examiner

PAUL L. GENSLER, Assistant Examiner

U.S. Cl. X.R.

333—81; 307—312